May 22, 1951     E. H. MUELLER     2,554,470
VALVE FOR CONTROLLING GAS
Filed July 5, 1947
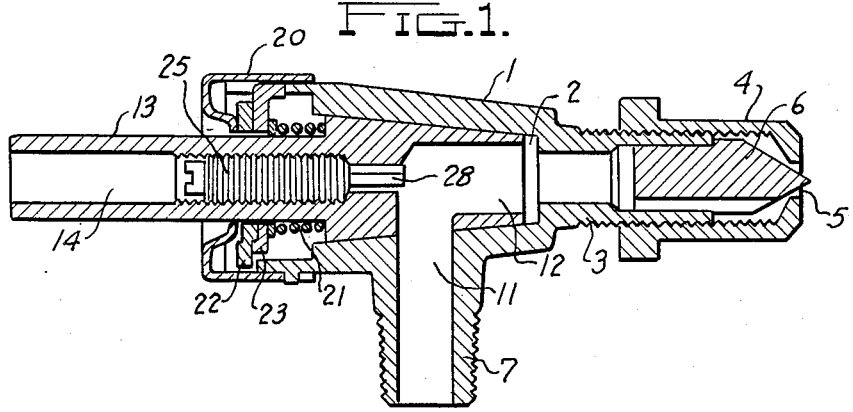
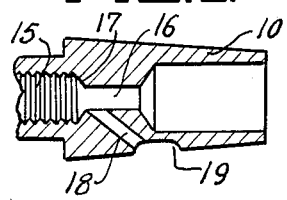
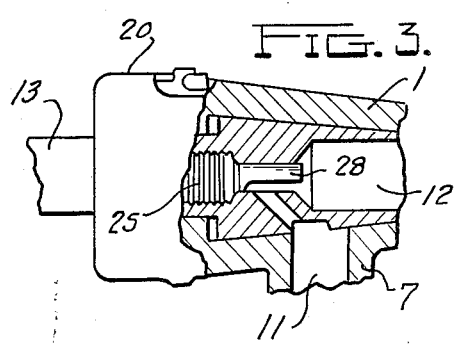
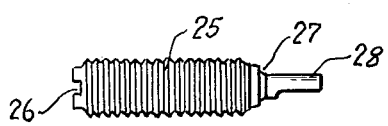
*INVENTOR.*
Ervin H. Mueller
BY
Barnes, Kisselle, Laughlin & Raisch
*ATTORNEYS*

Patented May 22, 1951

2,554,470

UNITED STATES PATENT OFFICE 2,554,470

VALVE FOR CONTROLLING GAS

Ervin H. Mueller, Grosse Pointe, Mich.

Application July 5, 1947, Serial No. 759,105

1 Claim. (Cl. 277—11)

This invention relates to a valve, especially for use with a device for burning gaseous fuel, such as the household gas range. The general object of the invention is to provide an improved, simplified construction for controlling the gas flame issuing from the burner and to provide a structure which can be easily and cheaply manufactured so that the valve can be supplied to the public at a correspondingly relatively low price.

The valve is one which has main gas flow ports therein which, when in registry, provides a flow of gas so that the full gas flame at the burner is afforded and it has another passage through which a lower volume of gas flows to provide a low or simmer flame. In accordance with the invention, a control means is provided by which the passage for the simmer flame may be throttled and controlled. This is accomplished by a throttling element capable of rotary adjustment in which only a few degrees of turning is necessary to adequately vary the throttling action and wherein separate sealing means for sealing the valve against escape of gas is avoided. To this end, the throttling element is mounted upon an elongated thread. The threaded engagement is of sufficient axial extent to prevent escape of gas and while the throttling element turns on the threads the axial movement produced in the adjusting action has nothing to do with the throttling function. With this arrangement, the throttling member can be adjusted tightly and engage a seat, thus to positively close the structure against loss of gas.

A structure for carrying out the invention is disclosed in the accompanying drawings:

Fig. 1 is a cross sectional view taken through the valve showing the valve in its full open position.

Fig. 2 is a sectional view illustrating the rotary tapered plug member of the valve.

Fig. 3 is a partial cross sectional view showing the valve in simmer position.

Fig. 4 is a side elevational view of the throttling member.

Fig. 5 is an end view of the throttling member.

The valve construction includes a body member 1 with a tapered valve chamber 2 therein and the body has a threaded outlet extension 3 for receiving a hood 4 with a discharge orifice 5 for cooperation with an orifice control member 6. By adjusting the hood on its screw threads, the orifice 5 may be varied by its movement relative to the member 6. The valve has an extension 7 which is threaded for attachment to a suitable conduit, and this provides the inlet.

A tapered valve member 10 seats in the chamber 2 and this member 10 is formed with a lateral port 11 which communicates with an axial passage 12. The valve member has a control stem 13 for receiving an operating handle (not shown) and the stem is hollow as shown at 14. A portion of the hollow interior of the stem is provided with a long internal thread 15. A relatively ensmalled passage 16 connects the hollow 14 with the passage 12 and the structure thereby provides a shoulder or valve seat 17. An angular port 18 of small cross sectional dimension connects with the passage 16 and with a recess 19 in the periphery of the valve member, the recess 19 being, at least in part, in alignment with the port 11.

The valve may be provided with a cap 20 in which is disposed a coil spring 21 for holding the valve member on its seat and for reacting against cooperating washers 22 and 23. One of the washers is keyed to the valve body and the other to the stem and the spring provides for relative axial movement to provide certain controlling functions which need not be further described.

A throttling member is in the form of a small integral element, having a threaded body portion 25 with one end notched at 26, or otherwise formed, to receive a turning tool. The other end is reduced in cross dimension to provide a shoulder 27 and the member has an ensmalled extension 28, which advantageously is of D formation in cross section, as shown in Figs. 4 and 5. The member 25 is located within the hollow stem on the screw threads and the extension 28 projects into the passage 16. The arcuate portion of the D formation has a nice fit with the wall of the passage 16, while the flat part of the D extends across the passage 16 on a chord, as will be appreciated by reference to Fig. 5.

It will readily be understood how the valve member 10 may be turned to register the port 11 with the inlet passage so that a full flow of gas is obtained. This position is shown in Fig. 1. The passage 18 is circumferentially removed from the port 11 any desired distance, say, for example, 90°, so that when the valve is turned in the proper direction 90°, the recess 19 and the port 18 register with the inlet as shown in Fig. 3. This provides a small flow of gas through the valve to furnish gas for a simmer flame.

Now, to control the simmer flame, the throttling member 25 may be manipulated. As shown in Fig. 3, the port 18 is widely opened by the D-shaped extension. By rotatably adjusting the throttling element, the arcuate portion of the D may be caused to partially overlie the end of the passage 18 to thus throttle the same. It is feasible to completely close the port 18 by the arcuate portion of the D. In this adjustment the throttling element shifts axially on its threads but this has nothing to do with the function of throttling. The D-shaped element 28 is sufficiently long so that it will perform a proper throttling function even though the throttling element is given several complete rotations on its threads.

The gas which enters the passage 16 through the port 18, and for that matter, the gas which enters through the port 11, has access to the end of the throttling member 25. The elongated threaded connection between the interior of the stem and the throttling element is sufficient to prevent escape of gas. Thus no gaskets or special seats or other sealing agencies are necessary. Nor does it make any difference whether the sealing element is positioned relatively forwardly, or to the right as Fig. 1 is viewed, or relatively rearwardly or to the left as Fig. 1 is viewed, except insofar as it is necessary that the projecting D-shaped element projects over the end of the port 18. If it be so desired, the throttling element may be adjusted to cause its shoulder 27 to seat tightly against the seat 17 to thus completely seal off the hollow stem from connection with the gas passages. This might be desirable in some instances where it is desired to put the simmer port completely out of commission and not use the same.

By turning the throttle member the D-shaped projection is caused to rotate and be advanced and retracted axially and in this action the port may be wiped clean of accumulated grease or other substance. Also, if there is a drop of accumulated grease or other substance on the projection, the extension may be advanced or retracted to bring another part of the extension into alignment with the simmer port.

I claim:

A valve for controlling the flow of gas to a gas burner comprising, a valve body having an inlet and an outlet, a valve member having a main inlet port and an outlet port, the inlet port being registerable with the inlet of the body by rotatable adjustment of the valve member, a hollow stem on the valve member, the valve member having a relatively small passage between the hollow stem and the outlet passage, the valve member having a simmer port connecting into the relatively small passage and registerable with the inlet of the body, said hollow stem having internal threads, a throttling member in the hollow stem having external threads in engagement with the said internal threads, said throttling member having a projection which extends into the passage normally beyond the simmer port, said projection being substantially of D-shape in cross section with the arcuate part of the D substantially fitting against the internal wall of the passage and with the flat side of the D providing a clearance so that said D-shaped projection throttles the simmer port upon rotational adjustment of the throttling member, said projection having an axial length in excess of that required to throttle the simmer port by rotational adjustment of the throttling member, to hereby remain in throttling relationship with the simmer port when the throttling member travels axially on its threads, said engaging threads providing a seal against the escape of gas.

ERVIN H. MUELLER.

REFERENCES CITED

The following references are of record in the file of this patent:

UNITED STATES PATENTS

| Number | Name | Date |
|---|---|---|
| 1,766,554 | Sieber | June 24, 1930 |
| 2,161,523 | Moecker | June 6, 1939 |
| 2,224,566 | Jaros | Dec. 10, 1940 |
| 2,249,982 | Rutherford | July 22, 1941 |